US009128195B2

(12) United States Patent
Soh et al.

(10) Patent No.: US 9,128,195 B2
(45) Date of Patent: Sep. 8, 2015

(54) INCREASING DYNAMIC RANGE FOR X-RAY IMAGE SENSOR

(75) Inventors: Myung-Jin Soh, Langley (CA); Seul-Yi Soh, Langley (CA)

(73) Assignees: LUXEN TECHNOLOGIES, INC., Seoul (KR); Myung-Jin Soh, Langley (CA)

( * ) Notice: Subject to any disclaimer, the term of this patent is extended or adjusted under 35 U.S.C. 154(b) by 493 days.

(21) Appl. No.: 13/432,529

(22) Filed: Mar. 28, 2012

(65) Prior Publication Data

US 2013/0256547 A1 Oct. 3, 2013

(51) Int. Cl.
| | |
|---|---|
| *G01T 1/17* | (2006.01) |
| *H04N 5/355* | (2011.01) |
| *G01T 1/24* | (2006.01) |
| *H04N 5/32* | (2006.01) |
| *H04N 5/378* | (2011.01) |
| *H04N 5/3745* | (2011.01) |

(52) U.S. Cl.
CPC *G01T 1/247* (2013.01); *H04N 5/32* (2013.01); *H04N 5/355* (2013.01); *H04N 5/378* (2013.01); *H04N 5/37455* (2013.01)

(58) Field of Classification Search
CPC ......... H04N 5/355; H04N 5/32; H04N 5/378; G01T 1/247
See application file for complete search history.

(56) References Cited

U.S. PATENT DOCUMENTS

| | | | |
|---|---|---|---|
| 5,789,737 A | 8/1998 | Street | |
| 6,229,134 B1 * | 5/2001 | Ang et al. | 250/208.1 |
| 6,486,808 B1 | 11/2002 | Seppi et al. | |
| 6,633,657 B1 | 10/2003 | Kump et al. | |
| 7,696,483 B2 * | 4/2010 | Tkaczyk et al. | 250/370.06 |
| 2002/0029122 A1 * | 3/2002 | Mizuno | 702/107 |
| 2003/0035510 A1 | 2/2003 | Strommer | |
| 2009/0108207 A1 | 4/2009 | Liu | |
| 2009/0168966 A1 | 7/2009 | Suzuki et al. | |
| 2010/0102241 A1 | 4/2010 | Zeller | |
| 2010/0171038 A1 | 7/2010 | Wirth | |
| 2011/0108735 A1 | 5/2011 | Ruetten et al. | |
| 2013/0058458 A1 * | 3/2013 | Desaute | 378/62 |
| 2013/0308847 A1 * | 11/2013 | Schirra et al. | 382/131 |

OTHER PUBLICATIONS

European Patent Application No. 13161776.3, Search Report, Mar. 13, 2014, 7 pages.
Tumer et al., "New Two-Dimensional Solid State Pixel Detectors With Dedicated Front-End Integrated Circuits for X-Ray and Gamma-Ray Imaging", IEEE Transactions on Nuclear Science, vol. 56, No. 4, Aug. 2009, pp. 2321-2329.
Perenzoni et al., "A Multispectral Analog Photon-Counting Readout Circuit for X-ray Hybrid Pixel Detectors", IEEE Transactions on Instrumentation and Measurement, vol. 57, No. 7, Jul. 2008, pp. 1438-1444.

* cited by examiner

*Primary Examiner* — Yara B Green
(74) *Attorney, Agent, or Firm* — Madeline F. Schiesser; Keohane & D'Alessandro, PLLC

(57) ABSTRACT

Embodiments of the present invention provide a computer-implemented method for determining an amplification gain for an X-ray image sensor module. Specifically, among other things, embodiments of the present invention provide a computer-implemented infrastructure comprising: capturing an electrical signal by a pixel sensor; and determining an amplification gain of the electrical signal at a charge sensitive amplifier by turning a switch on or off, wherein the switch connects the pixel sensor to a capacitor.

20 Claims, 4 Drawing Sheets

INCREASING DYNAMIC RANGE FOR X-RAY IMAGE SENSOR

FIELD OF THE INVENTION

The present invention relates to X-ray image sensors. More specifically, the present invention is related to an increasing dynamic range for an X-ray image sensor.

BACKGROUND OF THE INVENTION

The discovery of X-rays in 1895 was the beginning of a revolutionary change in our understanding of the physical world.

In the winter of the year of his fiftieth birthday, and the year following his appointment to the leadership of the University of Würzburg, Rector Wilhelm Conrad Roentgen noticed a barium platinocyanide screen fluorescing in his laboratory as he generated cathode rays in a Crookes tube some distance away. Leaving aside for a time his duties to the university and to his students, Rector Roentgen spent the next six weeks in his laboratory working alone and sharing nothing with his colleagues.

Three days before Christmas he brought his wife into his laboratory, and they emerged with a photograph of the bones in her hand and of the ring on her finger. The Würzburg Physico-Medical Society was the first to hear of the new rays that could penetrate the body and photograph its bones. Roentgen delivered the news on Dec. 28, 1895.

Emil Warburg relayed it to the Berlin Physical Society on Jan. 4, 1896. The next day the Wiener Press carried the news, and the day following, word of Roentgen's discovery began to spread by telegraph around the world.

Roentgen was well aware of the enormous help this technology could offer in diagnosing and treating previously undetectable internal ailments. Within a year after he published his findings, X-ray photographs were being used to assist doctors performing surgery and on the battlefield to locate bullets in the bodies of wounded soldiers. The impact of X-rays on the medical field has only increased since then with the development of fluoroscopy, angiography, and tomography.

X-rays are basically the same thing as visible light rays. Both are wavelike forms of electromagnetic energy carried by particles called photons. The difference between X-rays and visible light rays is the energy level of the individual photons. This is also expressed as the wavelength of the rays.

In general, X-rays have a short wavelength and may easily penetrate through a subject. Amounts of penetrating X-rays are affected by the density of an area of the subject. That is, an area of the subject may be indirectly observed due to the amounts of X-rays penetrating the subject. X-ray image sensors detect the amounts of X-rays penetrating the subject. The X-ray sensors detect the amounts of penetrated X-rays and may display a form of an area of the subject on a display device. X-ray sensors may be generally used in examination apparatuses such as a medical examination apparatus.

Today, digital X-ray imaging devices are rapidly replacing photographic film-based X-ray imaging devices in medical applications (e.g., dental applications and mammography). In addition to the inherent advantages associated with digital imaging, digital X-ray imaging devices can have the added benefit of being able to reduce the radiation dose received by a patient.

Typically, the readout circuit of an X-ray sensor converts each photon into an electrical voltage. The dynamic range of the X-ray sensor may be limited. For example, when a strong X-ray is emitted, the readout circuit may not go over a certain readout voltage. In such instances, it may be measured at the same output level as a weaker X-ray. With current readout integrated circuits, the charge sensitive amplifier (CSA) gain is fixed. Therefore, there is no way to increase the intensity of the X-rays. Thus, when the X-rays are converted into an image, the intensity is not increased.

There is a need to increase the dynamic range of an X-ray sensor. Heretofore, several unsuccessful attempts have been made to address these shortcomings.

U.S. Patent Application 20110108735 A1 discloses a high dynamic range X-ray detector with improved signal to noise ratio.

U.S. Pat. No. 5,789,737 discloses a high dynamic range segmented pixel sensor array.

U.S. Pat. No. 6,633,657 discloses a method and apparatus for controlling the dynamic range of a digital diagnostic image.

U.S. Patent Application 20090168966 discloses a medical digital X-ray imaging apparatus and medical digital X-ray sensor.

U.S. Patent Application 20030035510 discloses a sensor arrangement and method in digital X-ray imaging.

U.S. Patent Application 20090108207 discloses a CMOS sensor adapted for dental X-ray imaging.

U.S. Patent Application 20100171038 discloses a sensor unit for an X-ray detector and associated production method.

U.S. Patent Application 20100102241 discloses a system and method for automatic detection of X-rays at an X-ray sensor.

None of these references, however, teach a readout circuit for increasing the dynamic range of an X-ray sensor.

SUMMARY OF THE INVENTION

In general, embodiments of the present invention provide a computer-implemented method for determining an amplification gain for an X-ray image sensor module. Specifically, among other things, embodiments of the present invention provide a computer-implemented infrastructure comprising: capturing an electrical signal by a pixel sensor; and determining an amplification gain of the electrical signal at a charge sensitive amplifier by turning a switch on or off, wherein the switch connects the pixel sensor to a capacitor.

In one embodiment, there is an integrated circuit module configured to determine an amplification gain comprising: a pixel sensor configured to capture an electrical signal; and a charge sensitive amplifier comprising a capacitor and a switch for connecting the pixel sensor to the capacitor, the charge sensitive amplifier configured to control the amplification gain of the electrical signal by turning the switch on or off.

In a second embodiment, there is a computer-implemented method for determining an amplification gain for an X-ray image sensor module, comprising: capturing an electrical signal by a pixel sensor; and determining an amplification gain of the electrical signal at a charge sensitive amplifier by turning a switch on or off, wherein the switch connects the pixel sensor to a capacitor.

In a third embodiment, there is a computer-readable storage device storing computer instructions which, when executed, enables a computer system to determine an amplification gain for an X-ray image sensor module, the computer instructions comprising: capturing an electrical signal by a pixel sensor; and determining an amplification gain of the electrical signal at a charge sensitive amplifier by turning a switch on or off, wherein the switch connects the pixel sensor to a capacitor.

Embodiments of the embodiments of the present invention provide a computer-implemented method for determining an amplification gain for an X-ray image sensor module. Specifically, among other things, embodiments of the present invention provide a computer-implemented infrastructure comprising: capturing an electrical signal by a pixel sensor; and determining an amplification gain of the electrical signal at a charge sensitive amplifier by turning a switch on or off, wherein the switch connects the pixel sensor to a capacitor.

Figure 1:
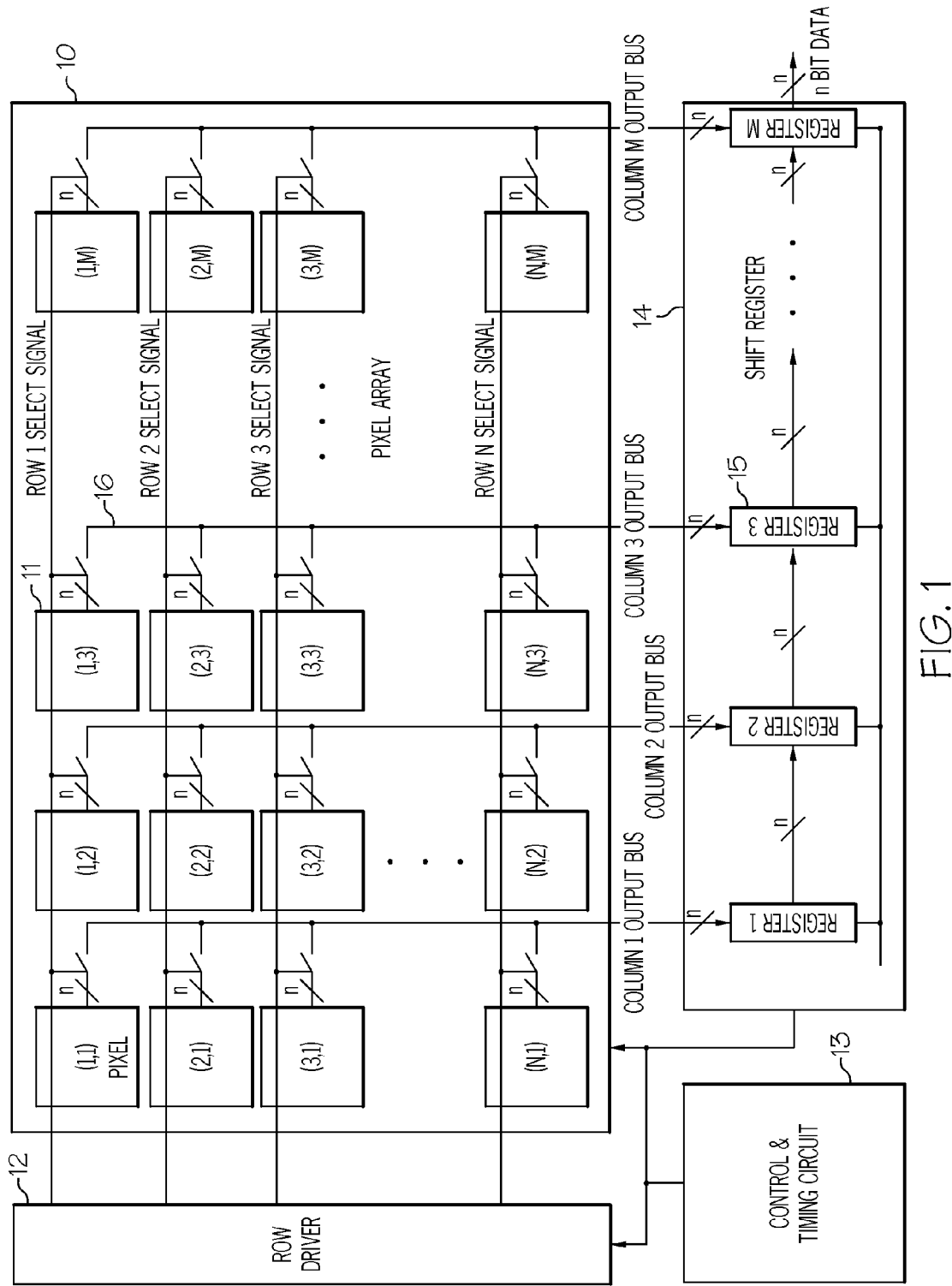
FIG. 1 shows a high-level schematic diagram showing a readout integrated circuit (ROIC) component of an X-ray image module.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide a computer-implemented method for determining an amplification gain for an X-ray image sensor module. Specifically, among other things, embodiments of the present invention provide a computer-implemented infrastructure comprising: capturing an electrical signal by a pixel sensor; and determining an amplification gain of the electrical signal at a charge sensitive amplifier by turning a switch on or off, wherein the switch connects the pixel sensor to a capacitor.

One of the key innovative aspects in X-ray imaging is the energy-resolved counting of the photons which are let through or transmitted by the object being analyzed when being exposed to X-ray radiation. Depending on the number and energy the transmitted photons have, it can be concluded, after a slice image reconstruction step, through which types of material the X-ray beams have traveled. In particular, this allows for the identification of different parts, tissues, and materials within a human body.

Referring now to FIG. 1, a photon counting X-ray image sensor module is depicted which may include a two-dimensional pixel array 10 including any number of rows and columns of single pixels 11, a row driver 12, a control and timing circuit 13, a shift register 14 including register 15, and a column output bus line 16. In some examples, the shift register 14 may include any number of registers. In some examples, any number of column output bus lines may be used.

Figure 2:
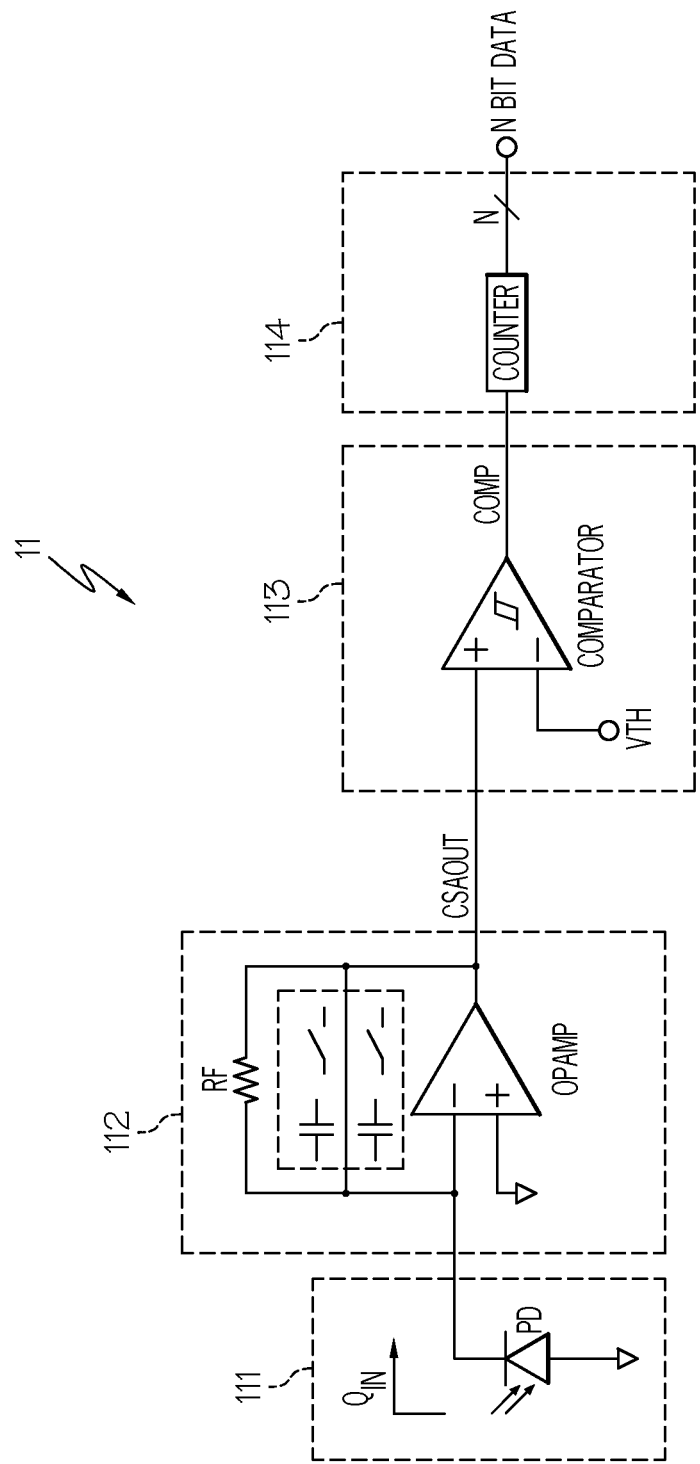
FIG. 2 shows a more detailed view of a single pixel as shown in FIG. 1.

FIG. 2 depicts an example single pixel integrated circuit 11 to improve the dynamic range of an X-ray sensor readout. The integrated circuit consists of an X-ray input area comprising a sensor 111, charge sensitive amplifier (CSA) 112, comparator 113, and counter 114.

The sensor 111 receives optical signals and outputs electric pulses corresponding to the received optical signals. For example, the sensor 111 detects photons and generates respective pulse currents corresponding to the detected photons. Such a sensor 111 may be implemented using a photodiode (PD) that generates current in response to light, for example. A photodiode is a type of photodetector capable of converting light into either current or voltage, depending upon the mode of operation. The sensor 111 may be a digital charge-coupled device (CCD) or complementary metal-oxide-semiconductor (CMOS), and the incident light could include light of different wavelengths, including X-ray photons, as only an example. Additionally, the sensor 111 may include plural photon detectors, such as respectively detecting photons for different sensors.

The charge sensitive amplifier 112 may be used to convert the small output current of a photodiode transducer to a fast responding voltage. In one example, a charge sensitive amplifier 112 (OPAMP) may be used to convert the electrical pulses into a voltage (shown in FIG. 2 as current sense amplifier output or CSAOUT). An operational amplifier (OPAMP) is a DC-coupled high-gain electronic voltage amplifier with a differential input and, usually, a single-ended output. In the example described herein, the charge sensitive amplifier is used in a single photon X-ray readout circuit. In other examples, the charge sensitive amplifier 112 also can be used with other readout circuits.

When X-rays strike the photodiode 111, signal charge pulses ($Q_{IN}$) are generated, with amplitude according to the particle energy. As a result, the signal charge pulses ($Q_{IN}$) are all integrated into a feedback capacity array (CF1 to CFn) and then output as voltage pulses (CSAOUT). At this point, since the feedback resistance (RF) for direct current is connected in parallel to the feedback capacity (CF), the output becomes voltage pulses that slowly discharge. Thus, the signal charge pulses are converted into voltage pulses. The $Q_{IN}$ is connected to the negative ("−") node of the charge sensitive amplifier 112. An amplifier array is connected to the positive ("+") node of the charge sensitive amplifier 112. The feedback resistance (RF) and the feedback capacity array (CF1 to CFn) are connected between the amplifier array output nodes ("+" and "−").

A pixel 11 may include one or more comparators 113. A comparator 113 compares the voltage pulses output by the charge sensitive amplifier 112, a predefined voltage threshold (VTH), and outputs the digital comparison result (COMP). In one example, the comparator 113 may serve to review the amplified pulse signal for a lower threshold (e.g., with pulse signals that are greater than this threshold being identified as representing photons). In another example, the comparator 113 may also discriminate the amplified pulse signal for an upper threshold for potentially discriminating out pulse signals that are too high.

The comparator 113 is connected to the positive (+) node of the charge sensitive amplifier 112. The comparator 112 produces the voltage output (CSAOUT). The comparator's negative (−) node receives the predefined voltage threshold (VTH). The comparator 113 compares the CSAOUT from the charge sensitive amplifier 112 and the VTH. It produces the compared value (COMP) from the high to the low (width) when the CSAOUT state is dropped from the VTH.

In one example, only one counter may be used for one pixel. The counter 114 may be configured to operate on an input voltage or current to count photons that are passed through the comparator 113. The counter 114 counts the number of photons detected for the respective pixel based upon an output of the comparator. In other words, the counter 114 counts the COMP from the comparator 113. When a photon is emitted, a COMP is produced. (Pulse signals that are greater than the given reference voltage VTH). The total energy from the X-ray may be equal to the pulse number of the COMP (Pulse signals with significance, which means having greater voltage level than the VTH will produce digital pulse signals—COMP (comparator output)).

The pixel output data from pixel 11 may be comparable to the pixel photodiode which was reflected from the X-ray and, therefore, the counted COMP from the counter 114. The resolution of counter 114 may be the same as the N-bit number of the pixel data. The counted pixel data is transmitted to the buffer and stored temporary at a buffer. The pixel data may be transmitted to an outside circuit or device to produce an image. In some examples, the pixel data can be transmitted via an N-bit parallel bus or a serial bus.

Figure 3:
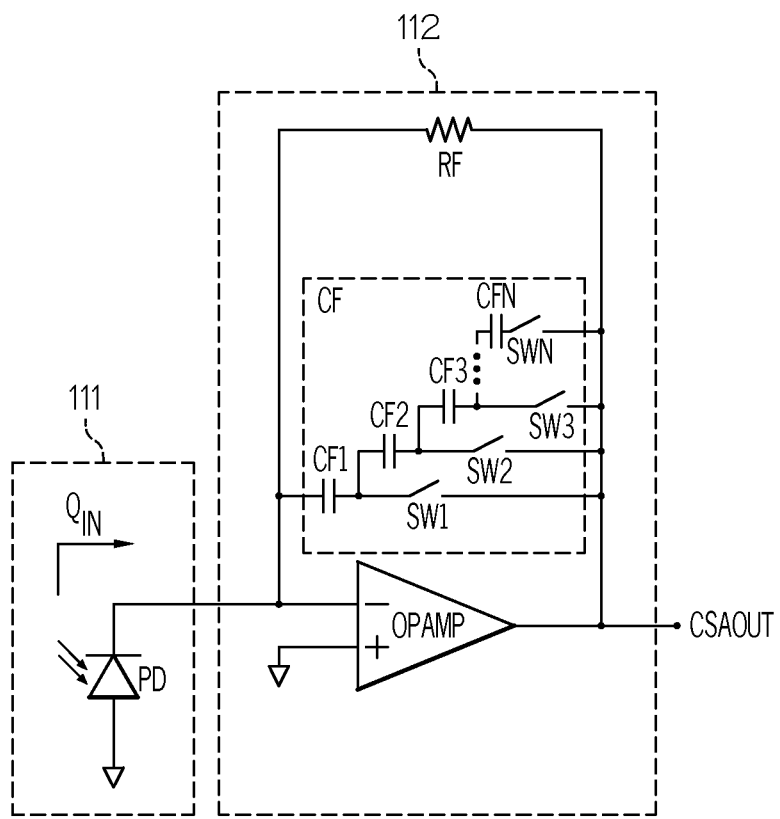
FIG. 3 shows a more detailed view of an example sensor and charge sensitive amplifier as shown in FIG. 1.

Referring now to FIG. 3, an example sensor 111 and charge sensitive amplifier 112 as shown in FIG. 1 are depicted in more detail.

The feedback capacity (CF) may include a feedback capacity array (CF1~CFn) and multiple switches (SW1~SWn) and is connected to the feedback (RF) with at least one capacity and one switch. In one example, the number of switches may be defined by a user. In a second example, the number of switches may be defined by an X-ray value. In other words, it can be closed based on the gain control signal (GCON) of a controller. The feedback capacity (CF) that is connected to the feedback resistance (RF) by at least one switch stores the $Q_{IN}$ from the X-ray input area.

The negative node of the charge sensitive amplifier 112 is virtually connected to the positive node. Therefore, due to the stored $Q_{IN}$ in the CF voltage difference, an output is produced on the array amplifier. The CSAOUT of the voltage drop detection amplifier 112 is equal to the $Q_{IN}$/CF. Therefore, the inputted X-ray may convert into a voltage signal based on the charge volume. The CASOUT size can be adjusted by the feedback capacity array (CF1~CFn).

The gain value may be defined by the charge sensitive amplifier 112. The charge gain amplifier 112 controls one or more capacitors, with each capacitor having one or more switches which may be turned on or off to define the gain value. A control signal controls whether a switch is turned on or off. A control signal may control one or more switches. In one example, the control signal may be predefined by a user. In a second example, an X-ray volume may be detected and converted to a control signal.

In other words, a controller may send a gain control signal to control the switch status of the feedback capacity of the charge sensitive amplifier 112. One or more switches may be closed depending on the gain control signal (GCON). The feedback capacity may contain multiple capacities. When X-rays are emitted, the voltages from the photodiodes are converted into signals according to an inverted combined capacity value. The comparator 113 compares a predefined threshold value to the signals and produces the output pulses. The counter 114 counts the pulses and converts the counts into digital signals.

Figure 4:
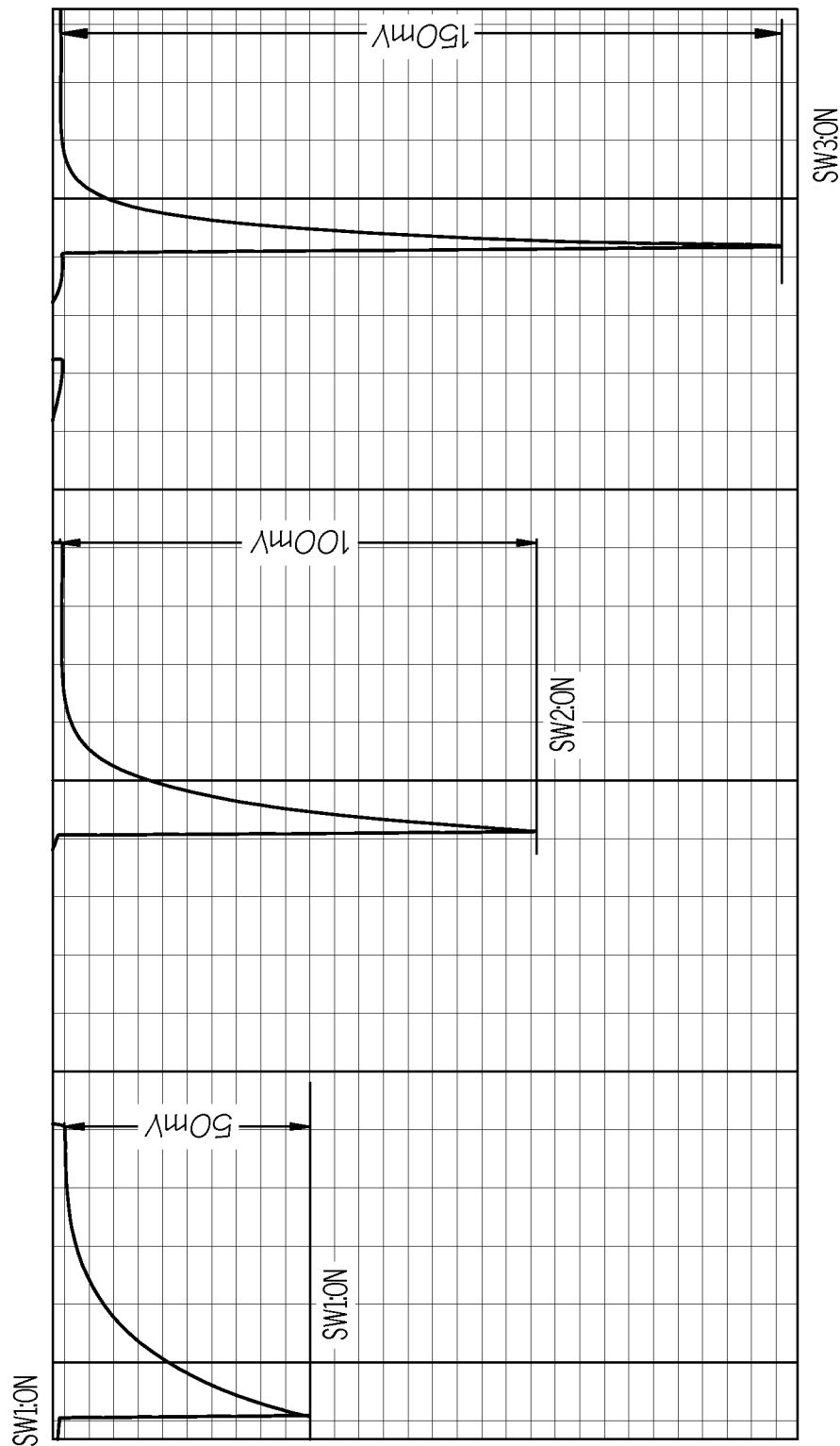
FIG. 4 shows an example wave form according to an embodiment of the present invention.

FIG. 4 shows an example wave form according to an embodiment of the present invention. As shown, with switch 1 turned on (SW1:ON), the gain is 50 mV. With switch 2 turned on (SW2:ON), the gain is 100 mV. With switch 3 turned on (SW3:ON), the gain is 150 mV.

In addition to the above described embodiments, embodiments can also be implemented through computer readable code/instructions in/on a non-transitory medium (e.g., a computer readable medium), to control at least one processing device, such as a processor or computer, to implement any above described embodiment. The medium can correspond to any defined, measurable, and tangible structure permitting the storing and/or transmission of the computer readable code.

The medium may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An integrated circuit module configured to determine an amplification gain, comprising:
   a pixel sensor configured to capture an electrical signal;
   a charge sensitive amplifier comprising a plurality of capacitors and a plurality of switches each for connecting the pixel sensor to one or more of the plurality of capacitors, the one or more of the plurality of capacitors disposed in series to one another and in parallel to a feedback resistor of the charge sensitive amplifier, and the charge sensitive amplifier configured to control the amplification gain of the electrical signal by turning one of the plurality of switches on or off; and
   a single counter configured to count a photon detection for a pixel based upon an output of a comparator.

2. The integrated circuit module of claim 1, wherein the switch is turned on or off in response to a gain control signal.

3. The integrated circuit module of claim 2, wherein the gain control signal is predefined.

4. The integrated circuit module of claim 2, wherein the gain control signal is generated based on an X-ray volume.

5. The integrated circuit module of claim 1, wherein the charge sensitive amplifier is further configured to convert the electrical signal into a voltage.

6. The integrated circuit module of claim 5, wherein the comparator is configured to compare the voltage derived from the electrical signal with a reference voltage to discriminate whether the electrical signal from the pixel sensor represents a photon detection.

7. The integrated circuit module of claim 1, wherein the pixel sensor comprises a photodiode.

8. A computer-implemented method for determining an amplification gain for an X-ray image sensor module, comprising:
   capturing an electrical signal by a pixel sensor;
   determining an amplification gain of the electrical signal at a charge sensitive amplifier by turning one of a plurality of switches on or off, wherein the one of a plurality of switches connects the pixel sensor to one or more of a plurality of capacitors disposed in series to one another and in parallel to a feedback resistor of the charge sensitive amplifier; and
   counting, using only a single counter, a photon a photon detection for a pixel based upon an output of a comparator.

9. The computer-implemented method of claim 8, wherein the step of turning the switch on or off is in response to a gain control signal.

10. The computer-implemented method of claim 9, wherein the gain control signal is predefined.

11. The computer-implemented method of claim 9, further comprising generating the gain control signal based on the electrical signal.

12. The computer-implemented method of claim 8, further comprising converting the electrical signal into a voltage.

13. The computer-implemented method of claim 12, further comprising:
   comparing the voltage derived from the electrical signal with a reference voltage to discriminate whether the electrical signal from the pixel sensor represents a photon detection; and
   counting a photon detection based on the discrimination.

14. The computer-implemented method of claim 8, wherein the pixel sensor comprises a photodiode.

15. A computer-readable storage device storing computer instructions which, when executed, enables a computer system to determine an amplification gain for an X-ray image sensor module, the computer instructions comprising:
   capturing an electrical signal by a pixel sensor;
   determining an amplification gain of the electrical signal at a charge sensitive amplifier by turning one of a plurality of switches on or off, wherein the one of a plurality of switches connects the pixel sensor to one or more of a plurality of capacitors disposed in series to one another and in parallel to a feedback resistor of the charge sensitive amplifier; and
   counting, using only a single counter, a photon a photon detection for a pixel based upon an output of a comparator.

16. The computer-readable storage device of claim 15, further comprising computer instructions for turning the switch on or off is in response to a gain control signal.

17. The computer-readable storage device of claim 16, wherein the gain control signal is predefined.

18. The computer-readable storage device of claim 16, further comprising computer instructions for generating the gain control signal based on the electrical signal.

19. The computer-readable storage device of claim 15, further comprising computer instructions for converting the electrical signal into a voltage.

20. The computer-readable storage device of claim 15, wherein the pixel sensor comprises a photodiode.

* * * * *